Patented Dec. 15, 1925.

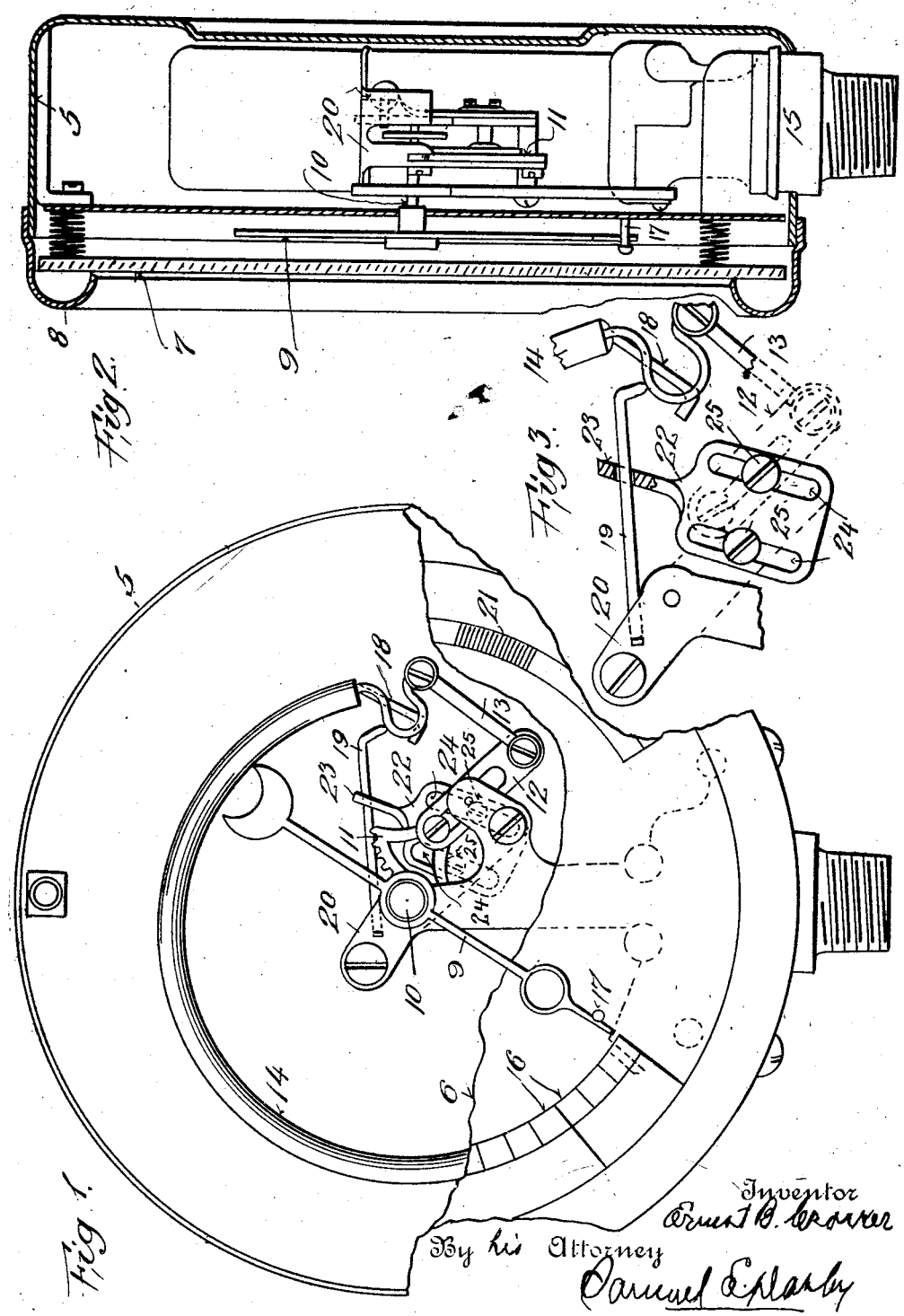

1,565,552

UNITED STATES PATENT OFFICE.

ERNEST B. CROCKER, OF STRATFORD, CONNECTICUT, ASSIGNOR TO MANNING, MAXWELL & MOORE, INC., OF NEW YORK, N. Y., A CORPORATION OF NEW JERSEY.

RETARD DEVICE FOR BOURDON GAUGES.

Application filed April 12, 1920. Serial No. 373,142.

*To all whom it may concern:*

Be it known that I, ERNEST B. CROCKER, a citizen of the United States, residing at Stratford, county of Fairfield, State of Connecticut, have made a certain new and useful Invention in Retard Devices for Bourdon Gauges, of which the following is a specification.

This invention relates to pressure gauges and more particularly to retard gauges of the general type disclosed in the patent to Loepsinger No. 1,189,706 dated July 4, 1916.

The principal object of the present invention is to provide retard means of simple and effective character, readily applicable to gauge movements of usual type and capable of adjustment to permit selective determination of the pressure at which the retard action shall commence and also to assure proper cooperation between the index and the scale while the retard means is operative.

In the accompanying drawings a preferred embodiment of the invention is illustrated by way of example and in such drawings:—

Fig. 1 is a fragmentary front elevation of a gauge embodying the invention, a portion of the dial being broken away to show the gauge movement;

Fig. 2 is a vertical section through the gauge illustrated in Fig. 1, and

Fig. 3 is a fragmentary front elevation to larger scale showing details of the free end of the Bourdon tube and the retard devices.

In the accompanying drawing reference numeral 5 designates the gauge casing having the dial plate 6, the transparent face plate 7, retaining cap ring 8, an index, pointer, or dial hand 9, dial hand spindle 10, segment gear 11 for rotatively actuating the spindle 10, adjustable slide member 12, link connection 13 from the slide member to the free end of the Bourdon tube 14. The tube is being mounted and supported within the casing upon a socket 15 designed to be connected to a source of pressure to be indicated. These parts, in themselves, form no part of my present invention, and therefore may be of any suitable and convenient construction and arrangement, or may be varied, altered or changed as may be desired.

When internal pressure is supplied to the tube 14, the resulting movement thereof is transmitted to the dial hand which is thereby moved over the scale graduations 16, which are uniformly and equally spaced apart for normal operation of the instrument under normal pressure variations.

In the embodiment of my invention, which I have chosen to illustrate I provide the free end of the Bourdon tube with a member 18, forming, in effect, an extension stop, with which cooperates one end of an auxiliary retard spring 19. This retard spring is mounted at its other end upon a fixed part of the frame 20, in which the segment gear 11 and its associated parts are mounted. The free end of the retard spring is positioned a sufficient distance away from the tube member or stop 18 to permit the free movement of the tube, unretarded except for its inherent resistance, under conditions of normal pressure variations, but when the pressure exceeds that for which the retard spring is adjusted, then, thereafter, the stop member 18 impinges against the free end of the retard spring 19, thereby imposing an auxiliary or supplemental resistance upon the Bourdon tube and reducing the range of movement thereof per unit of pressure variation, causing the dial hand to move through a shorter arc for the same pressure increase than in the case of the unretarded movement of the tube.

To afford accurate indication by the instrument of the pressure variations under excessive or abnormal pressures, a portion of the dial plate is graduated more finely or in closer spacial relation, as indicated at 21, Fig. 1, than the scale graduations 16 corresponding to the unretarded tube movements under normal pressure variations. In order to adjust the action of the retard spring, and the point at which its action is imposed upon the tube, I provide an adjustable fulcrum for said spring. This fulcrum may conveniently be in the form of a plate 22, suitably mounted upon the frame 20, and having an extension 23, with an opening therethrough, through which the spring 19 extends. The fulcrum plate 22 may be adjustably mounted in any suitable or convenient manner. One simple and efficient arrangement is shown wherein said plate is provided with the parallel slots 24, disposed at the opposite side edges of said plate and through which the clamp screws 25 work. By loosening up the screws 25, the fulcrum plate 22 may be adjusted to vary the normal spacial relation of the free end of spring 19 with relation to the tube stop member 18, and also to vary the point in the length of said spring 19 which engages in the hole in the fulcrum plate extension 23, thereby varying the effective length of said spring, and hence varying the degree of auxiliary or supplemental resistance tension exerted thereby upon the tube movements.

It will be seen that by mounting the auxiliary retard spring 19 on the frame which carries the gauge movement the point at which the tube extension 18 engages therewith is not disturbed or altered by distortion of the gauge case in handling the instrument or otherwise and which might seriously affect the accuracy of the readings.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of the invention which, as a matter of language, might be said to fall therebetween.

Having described my invention, what I claim as new and desire to secure by Letters Patent is:

1. In a Bourdon tube gauge, a casing, a Bourdon tube, a dial hand or pointer, connections intermediate said dial hand or pointer and tube for actuating the former by the latter, and a frame arranged within the casing and upon which said connections are mounted, in combination with an auxiliary retarder mounted on said frame and arranged to engage an element moving with the tube only under conditions of excessive pressure whereby to impose a supplemental resistance thereon, and means by which the effective action of said retarder can be adjusted.

2. In a Bourdon tube gauge, a casing, a Bourdon tube, a dial hand or pointer, connections intermediate said dial hand or pointer and tube for actuating the former by the latter, and a frame arranged within the casing and on which said connections are mounted, in combination with a spring also mounted on said frame and arranged to engage a part moving with the tube under conditions of excessive pressure whereby to impose a supplemental resistance thereon, and means to adjust the effective length of said spring.

3. In a Bourdon tube gauge, a casing, a Bourdon tube, a dial hand or pointer, connections intermediate said dial hand or pointer and tube for actuating the former by the latter, and a frame arranged within the casing and upon which said connections are mounted, in combination with an auxiliary retarder mounted on said frame and arranged to engage a part carried by the tube under conditions of excessive pressure and to impose a supplemental resistance thereon, and an adjustable fulcrum for said retarder and means by which said fulcrum may be adjusted.

4. In a Bourdon tube gauge, a casing, a Bourdon tube, a dial hand or pointer, connections intermediate said dial hand or pointer and tube for actuating the former by the latter, and a frame arranged within the casing and upon which said connections are mounted, in combination with a stop member and a retarding spring arranged to be brought into engagement with each other under conditions of excessive pressure, one of these parts being carried by said tube, and the other being mounted on said frame, and means to adjust said retarding spring with relation to said stop member.

5. In a Bourdon tube gauge, a casing, a Bourdon tube, a dial hand or pointer, connections intermediate said dial hand or pointer and tube for actuating the former by the latter, and a frame arranged within the casing and upon which said connections are mounted, in combination with a stop member and a retarding spring arranged to be brought into engagement with each other under conditions of excessive pressure, one of these parts being carried by said tube and the other being mounted on said frame, and an adjustably mounted fulcrum for said retarding spring.

6. In a Bourdon tube gauge, a casing, a Bourdon tube, a dial hand or pointer, connections intermediate these parts for actuating the latter, and a frame arranged within the casing and upon which said connections are mounted, in combination with a stop member and a retarding spring arranged to be brought into engagement with each other under conditions of excessive pressure, one of these parts being carried by said tube, and the other being carried by said frame, and a fulcrum plate having a fulcrum engaging the said other part, said fulcrum plate being mounted on said frame for adjustment to vary the position of the fulcrum point thereon with relation to said other part.

7. In a Bourdon tube gauge, a casing, a Bourdon tube, a dial hand or pointer, connections intermediate these parts for actuating the latter, and a frame arranged within the casing and upon which said connections are mounted, in combination with a stop member and a retarding spring arranged to be brought into engagement with each other under conditions of excessive pressure, one of these parts being carried by said tube and the other being carried by said frame, and a fulcrum plate having an opening through which said spring extends to form a fulcrum for the spring, and means to adjust said fulcrum plate and means by which said fulcrum may be adjusted.

8. In a Bourdon tube gauge, a casing, a Bourdon tube, a dial hand or pointer, connections intermediate these parts for actuating the latter, and a frame arranged within the casing and upon which said connections are mounted, in combination with a stop member and a retarding spring arranged to be brought into engagement with each other under conditions of excessive pressure, one of these parts being carried by said tube and the other being carried by said frame, and a fulcrum plate having an element constituting a fulcrum for said spring, the fulcrum plate being adjustably mounted on said frame.

9. A gauge having a casing, a scale having one portion graduated more closely than another portion, a frame within the casing, and a movable index mounted upon the frame and cooperating with the scale, and means for actuating the index comprising a Bourdon tube, connections between the tube and index, retard means mounted upon the frame and cooperable with the tube for changing the resistance of the latter to deformation under pressure, and adjustable means also mounted upon the frame cooperating with said retard means for selectively determining the pressure at which the retard means becomes effective to modify the movement of the tube and also for determining the degree of retard action.

10. A gauge provided with a movable index, a scale with which it cooperates, said scale having two differently spaced sets of graduations corresponding to different pressure ranges, the more closely graduated portion corresponding to the higher pressure range, and means for actuating the index comprising a Bourdon tube, connections between the tube and index, means operative when the index passes from the less closely to the more closely graduated portion of the scale to oppose a supplementary resistance to movement of the tube under increased pressure, and adjustable means cooperating with said supplementary resistance means whereby to vary the amount of such supplementary resistance.

11. A gauge provided with a movable index, a scale cooperating therewith, said scale having a series of widely spaced graduations for low pressures and a series of closely spaced graduations for high pressures, and means for moving the index comprising a Bourdon tube, connections between the tube and index, means for changing the responsiveness of the tube to pressure, and adjustable means for varying the action of the resistance changing means to cause the change in responsiveness to take place as the index passes from one series of graduations to the other and for independently varying the action of the resistance changing means to cause the index correctly to cooperate with the graduations of the more closely spaced series.

12. A gauge having a movable index, a scale cooperating therewith, said scale having series of graduation, the graduations in one series being more closely spaced than in another, and means for actuating the index comprising a Bourdon tube, connections between the tube and index, a spring normally unconnected to the tube but cooperable therewith resiliently to decrease the responsiveness of the tube to pressure while the index cooperates with the more closely spaced series of graduations, only, and adjustable means for varying the effective stiffness of the spring.

13. A gauge having a movable index, a scale cooperating therewith, said scale having series of graduations, the graduations in one series being more closely spaced than those in another, and means for actuating the index comprising a Bourdon tube, connections between the tube and index, and resilient means to decrease the responsiveness of the tube to pressure while the index cooperates with the more closely spaced series of graduations only, said means comprising an elongate spring supported at one end, its other end normally being spaced from the tube but in a position to be engaged by an element partaking of the movement of the tube after a predetermined movement of the latter, and a fulcrum member engageable with said spring at a point intermediate the ends of the latter, said fulcrum member being adjustable lengthwise of the spring and also being adjustable transversely of the spring.

14. In a pressure gauge, a graduated dial, a hand or pointer cooperating therewith, a pressure responsive element, connections intermediate said element and the hand or pointer to actuate the latter, in combination with an auxiliary retard spring member cooperating with the pressure responsive element, and means by which the effective length of the spring member may be changed.

15. In a Bourdon tube gauge, a casing, a Bourdon tube, a dial hand or pointer, connections intermediate said dial hand or pointer and the tube for actuating the former by the latter, and a frame within the casing and upon which said connections are mounted, in combination with an auxiliary retarder mounted upon said frame independently of the casing and arranged for engagement by an element movable by the tube, such engagement taking place only under conditions of excessive pressure whereby to impose a supplementary resistance to movement of the tube.

16. In a retard pressure gauge, a casing, a base secured therein, a Bourdon tube carried by the base, an indicator carried by the base, operating means of connection between said tube and said indicator, and a resilient retard stop supported by the base independently of the casing and engageable with an element which receives its motion from the tube whereby at a predetermined point to check the movement of said element.

17. In a gauge construction, a Bourdon tube, a base for one end of said tube, a pointer connected to the free end of the tube, and a spring secured at one end to the base independently of the casing and having it free end located in the path of movement of a part which receives its motion from the tube, said spring engaging said part at a predetermined point in the movement of the latter whereby resiliently to retard its action.

In testimony whereof I have hereunto set my hand on this 30th day of March A. D. 1920.

ERNEST B. CROCKER.